United States Patent

[11] 3,570,544

| [72] | Inventor | Johannes Ortheil<br>Anrath, Germany |
|---|---|---|
| [21] | Appl. No. | 786,715 |
| [22] | Filed | Dec. 24, 1968 |
| [45] | Patented | Mar. 16, 1971 |
| [73] | Assignee | Langen & Co.<br>Dusseldorf, Germany |
| [32] | Priority | Jan. 9, 1968 |
| [33] | | Germany |
| [31] | | P 16 75 344.9 |

[54] HYDROPNEUMATIC PRESSURE RESERVOIR
2 Claims, 1 Drawing Fig.

[52] U.S. Cl. .................................................. 138/30
[51] Int. Cl. .................................................. F16l 55/04
[50] Field of Search........................................... 138/30

[56] References Cited
UNITED STATES PATENTS

| 3,224,345 | 12/1965 | Doetsch ..................... | 138/30X |
| 3,425,593 | 2/1969 | Kramer et al. ............... | 138/30 |
| 3,428,091 | 2/1969 | Sugimura et al. ............ | 138/30 |

*Primary Examiner*—Dorsey Newton
*Attorney*—Holman & Stein

ABSTRACT: A hydropneumatic pressure reservoir of substantially cylindrical configuration in which a partition subdivides the interior of the reservoir into a gas chamber and a liquid chamber and the reservoir being provided at the ends thereof with connections for the introduction of gas and liquid respectively. The partition is secured on or in the vicinity of the end which faces the gas chamber.

Patented March 16, 1971
3,570,544
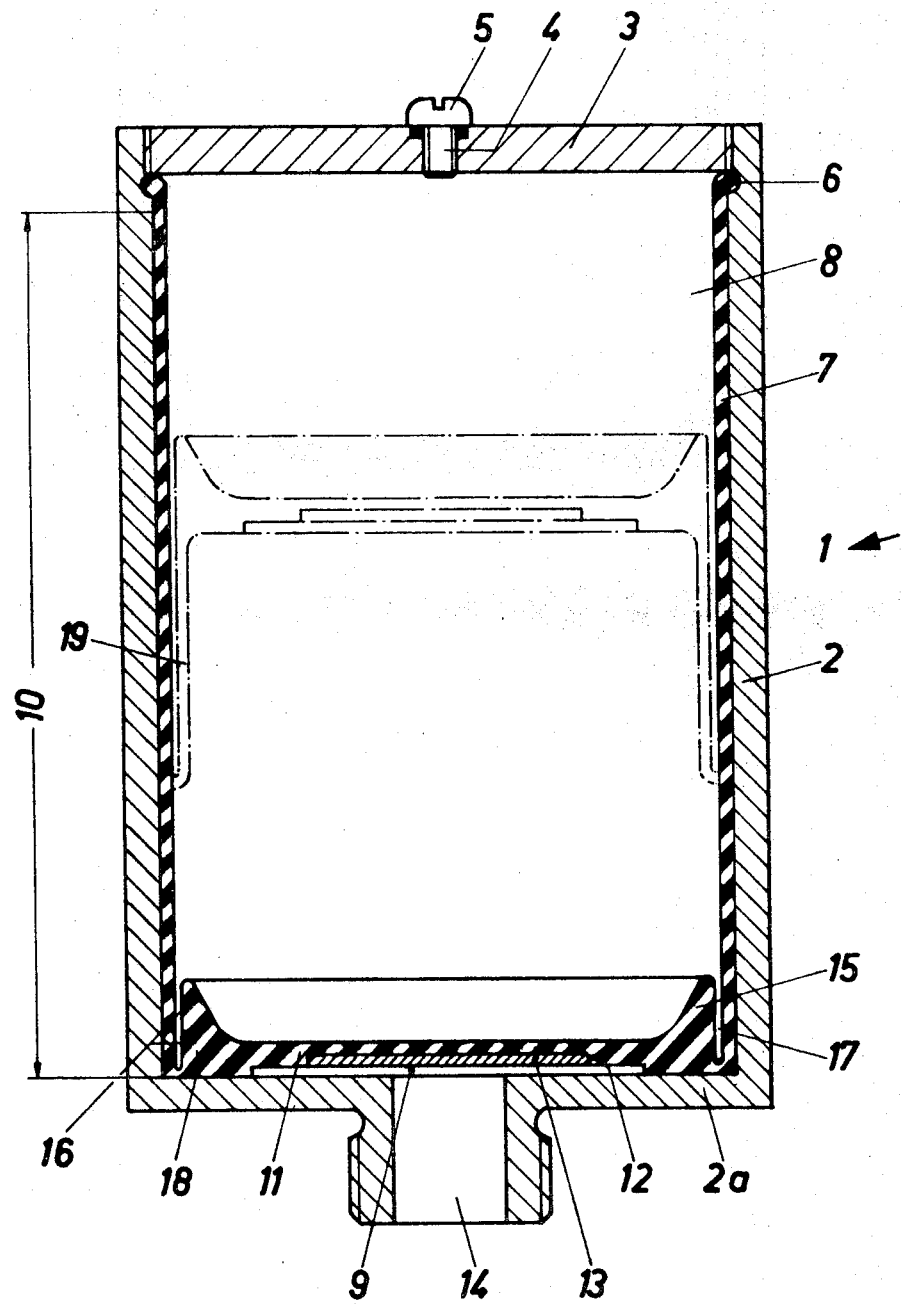
INVENTOR
JOHANNES ORTHEIL
BY Holman, Glascock, Downing &
Seebold
ATTORNEYS 3,570,544

HYDROPNEUMATIC PRESSURE RESERVOIR

BACKGROUND OF THE INVENTION

As is known, the partition in such reservoirs is subject, during operation, to various stresses which reduce the service life of the partition. For instance, expansions and contractions develop constantly in partitions of the type which do not fill the interior of the pressure reservoir in the unstressed state and such expansions and contractions can result in fatigue of the partition material and finally the rupture thereof. In order to avoid this objectionable characteristic, the partitions can be so dimensioned that the partition substantially fill the interior of the reservoir in the unstressed condition. When liquid is introduced into the pressure reservoir, the partition must fold by virtue of the reduced size of the gas chamber. With high ratios of operating pressure and initial gas pressure or in other words, with large amounts of stored liquid, the gas chamber can become so small that sharp holes and breaks develop in what might be termed an undefined fashion. As experience has demonstrated, since these holes frequently develop at the same points, the holes result into premature rupture which of course is undesirable. This can be prevented by limiting the admissable pressure ratio which rarely is in excess in practice of a value of 5. A higher pressure ratio can be realized, for example, with piston-type pressure reservoirs in which any pressure ratios are possible within the limits defined by the strength of the housing. However, these piston-type pressure reservoirs possess the objectionable characteristic in certain applications (for instance, damping of vibrations) in that the piston is provided with a greater mass than a bubble-shaped partition. In addition, the piston-type pressure reservoir has a higher gas loss which of course leads to a relatively rapid drop of the initial gas pressure.

SUMMARY OF THE INVENTION

The present invention relates to a hydropneumatic pressure reservoir and the object thereof is to provide a pressure reservoir of the above mentioned type which possesses the advantage of a piston-type pressure reservoir without the disadvantages thereof.

According to the invention, the problem is solved in that the partition is cup or pot-shaped and is provided with a reinforced bottom portion separated by an annular gap or hiatus on the side facing the gas chamber over a part of its axial length from the cylindrical portion of the partition and connected over the other part of its axial length facing the liquid chamber with a cylindrical portion. By virtue of this arrangement, the bottom parts function as a piston which slides upwardly and downwardly in the cylinder constituted by the cylindrical portion of the partition. The length and the resiliency of the axial extension at the edge of the bottom part should be measured in such a manner that under consideration of other parameters, there is allowed a slight tipping gradient, but canting is avoided and the partition is subjected to gentle action during the operation since only one circumferential fold is formed which, moves in addition, dependent on the stroke of the bottom part, over a corresponding range similar to the action in a bellows.

Further objects and advantages of the present invention will become more readily apparent to persons skilled in the art from the following detailed description and annexed drawings:

BRIEF DESCRIPTION OF THE DRAWINGS

The sole FIGURE is an axial cross-sectional view of a hydropneumatic pressure reservoir embodying the present invention.

DETAILED DESCRIPTION OF THE INVENTION

It will be noted that a pressure reservoir denoted generally 1 includes a cylindrical housing which is provided at one end with a bottom 2a and at its upper end a cover 3 is threaded into the housing 2. The cover 3 is provided with an axially directed connection 4 for gas and such connection is closed by a screw 5. The bottom 2a is provided with a liquid connection 14 which extends axially from the bottom.

A partition 7 is positioned within the housing 2 and divides the interior thereof into a gas chamber 8 and a liquid chamber 9. The partition 7 is provided with a reinforced edge 6 which is clamped in a gas and liquid tight manner between the cover 3 and the housing 2.

The partition 7 includes a cylindrical part 10 which is provided at one end with a reinforced bottom portion 11. A countersunk area 12 is provided in the center of the bottom portion 11 and is adapted to receive a plate of a material possessing great strength in order to prevent the partition 7 from moving out through the liquid connection 14. The depth of the countersunk area 12 and the thickness of the plate 13 are so dimensioned that the plate 13 will touch or contact the bottom under only a slight deformation of the bottom portion 11.

The bottom portion 11 is provided with an edge 15 having a greater axial extent than the center of the bottom portion 11. The edge 15 is separated by an annular gap or hiatus 17 over a part 16 of its axial extent on the side which faces the gas chamber 8 from the cylindrical portion 10 of the partition 7. Over the other part 18, the edge 15 is connected with the cylindrical portion 10 and a fold 19 (dot dash lines) is formed when the bottom portion 11 is retracted.

This invention is not to be confined to any strict conformity to the showing in the drawings but changes or modifications maybe made therein so long as such changes or modifications mark no material departure from the spirit and scope of the appended claims.

I claim:

1. A hydropneumatic pressure reservoir comprising a substantially cylindrical housing having end walls, one of said end walls being provided with a gas connection and the other end wall with a liquid connection, a partition positioned within the housing, said partition having a cylindrical portion, an open end and a bottom portion, said open end facing the gas connection for providing the interior of the housing with a gas chamber, said bottom portion having a recess therein facing said liquid connection for providing a liquid chamber within the housing, means securing the open end of said partition in a gas tight manner between the housing and said one end wall, said bottom portion having an upstanding peripheral edge facing said open end for providing a cup-shaped body facing the gas chamber, said upstanding peripheral edge being separated from the cylindrical portion of the partition by an annular gap opening in the direction of the gas chamber, said bottom portion having a countersunk area of lesser dimensions than said recess and merging with said recess, a plate of strong material positioned within said countersunk area for covering the liquid connection and preventing said bottom portion being forced through said liquid connection due to pressure in the gas chamber when the liquid chamber is empty, and said bottom portion functioning as a piston for upward and sliding movement within the housing.

2. The hydropneumatic pressure reservoir as claimed in claim 1 in which the length and resiliency of said upstanding peripheral edge are such as to allow a slight tipping gradient but avoid canting thereof.